United States Patent [19]

Ohyama

[11] Patent Number: 4,493,474
[45] Date of Patent: Jan. 15, 1985

[54] ELECTROMAGNETIC VALVE UNIT
[75] Inventor: Tadashi Ohyama, Okazaki, Japan
[73] Assignee: Aisin Seiki Kabushiki Kaisha, Kariya, Japan
[21] Appl. No.: 370,269
[22] Filed: Apr. 20, 1982
[30] Foreign Application Priority Data
 Apr. 22, 1981 [JP] Japan .............. 56-58340[U]
[51] Int. Cl.³ .............................. F16K 31/06
[52] U.S. Cl. ................... 251/129; 251/335 B; 251/282
[58] Field of Search .......... 251/129, 141, 335 B, 251/282; 137/625.65

[56] References Cited

U.S. PATENT DOCUMENTS

| | | | |
|---|---|---|---|
| 3,441,246 | 4/1969 | Lauppe et al. | 251/129 X |
| 4,270,726 | 6/1981 | Hertfelder et al. | |
| 4,354,525 | 10/1982 | Oyama et al. | 251/129 X |

FOREIGN PATENT DOCUMENTS

| | | | |
|---|---|---|---|
| 228579 | 7/1963 | Austria | 251/129 |
| 698160 | 11/1964 | Canada | 251/141 |
| 713074 | 8/1931 | France | 251/129 |

Primary Examiner—Arnold Rosenthal
Attorney, Agent, or Firm—Oblon, Fisher, Spivak, McClelland & Maier

[57] ABSTRACT

An electromagnetic valve unit wherein a solenoid coil is assembled within a motor housing in surrounding relationship with a stationary core, a yoke member is fitted at its outer periphery to the corresponding fitting faces of the motor housing and a valve housing, a spring-loaded shaft is slidably supported by a pair of bearings in the stationary core and the yoke member for axial movement, and a movable core is fixed to the shaft to be moved between the stationary core and the yoke member. In such arrangement, a sleeve member of non-magnetic material is coupled over the stationary core and a stepped portion of the yoke member for alignment of the spaced bearings, and the yoke member has an annular shoulder coupled within the valve housing for alignment of the shaft in relation to a valve seat member which is assembled within the valve housing to cooperate with a valve element on the shaft.

9 Claims, 1 Drawing Figure

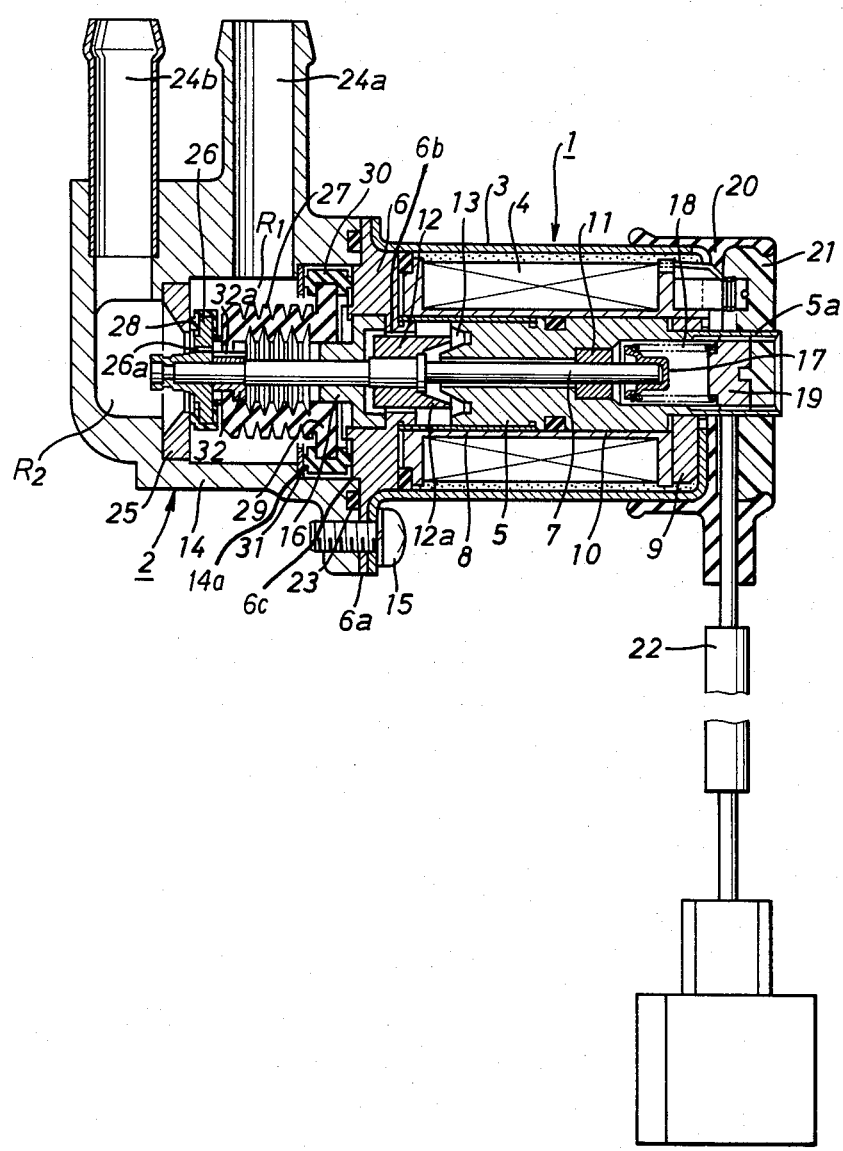

ELECTROMAGNETIC VALVE UNIT

BACKGROUND OF THE INVENTION

The present invention relates to electromagnetic valve units, and more particularly to an electromagnetic valve unit of the type which includes a flow control valve assembly operatively associated with an electromagnetic motor assembly for actuating the valve assembly in response to an electric current applied thereto from an electric control circuit.

In such electromagnetic valve units as described above, the motor assembly includes, in general, a drive shaft slidably supported for axial movement in bearings, and the valve assembly includes a valve seat member mounted therein and a valve element fixed to one end of the shaft to cooperate with the valve seat member to control the flow of fluid passing therethrough. In this type of assembling construction, it is required to ensure alignment of the shaft relative to the valve seat member. The alignment of the shaft is, however, influenced by the accuracy of positioning of respective component parts to be assembled between the shaft and the valve seat member in assembly of the unit.

SUMMARY OF THE INVENTION

It is, therefore, a primary object of the present invention to provide an improved electromagnetic valve unit which is capable of ensuring alignment of the shaft relative to the valve seat member in a simple manner and mounting of the shaft in place within the valve unit with a relatively small number of component parts.

According to a first aspect of the present invention there is provided an electromagnetic valve unit including a flow control valve assembly for controlling the flow of fluid passing therethrough and operatively associated with an electromagnetic motor assembly for actuating the valve assembly in response to an electric current applied thereto from an electric control circuit. The motor assembly includes a motor housing of magnetic material provided at one end thereof with a fitting face, a solenoid coil concentrically assembled within the motor housing and connected to the electric control circuit, a stationary core of magnetic material surrounded by the solenoid coil, a yoke member of magnetic material fitted at its outer periphery to the fitting face of the motor housing and having a stepped portion arranged to be coaxial with the stationary core, a shaft of non-magnetic material extending through the axes of the stationary core and the yoke member into the valve assembly, first and second bearing means for axially slidably supporting the shaft respectively from the stationary core and the yoke member, a movable core of magnetic material fixed to the shaft to be axially moved between the stationary core and the yoke member, a sleeve member of non-magnetic material surrounded by the solenoid coil and coupled over the stationary core and the stepped portion of the yoke member for alignment of the first and second bearing means, and resilient means for loading the shaft toward the valve assembly. The valve assembly includes a valve housing secured to the motor housing through the outer periphery of the yoke member and being provided with first and second ports, a valve seat member assembled within the valve housing to subdivide the interior of the valve housing into first and second chambers, respectively, in open communication with the first and second ports, the valve seat member being in surrounding relationship with the shaft, and a valve element fixed to the shaft to cooperate with the valve seat member to control the flow of fluid between the first and second chambers in response to axial movement of the shaft.

According to a second aspect of the present invention, the yoke member is provided with an annular shoulder which is fixedly coupled within the valve housing for alignment of the shaft relative to the valve seat member. It is also preferable that the valve assembly further comprises bellows means interposed in a fluid-tight manner between the yoke member and the shaft for preventing the flow of fluid from the interior of the valve housing into the motor assembly. The bellows means is preferably provided with an annular flange which is fixed in a fluid-tight manner to the yoke member through an annular seal member of elastic material to avoid a partial stress acting thereon.

BRIEF DESCRIPTION OF THE DRAWING

The above-mentioned object and features of the present invention will become clear from the following detailed description with reference to the accompanying drawing, in which a single FIGURE depicts an elevational cross-section of an electromagnetic valve unit in accordance with the present invention.

DESCRIPTION OF THE PREFERRED EMBODIMENT

Referring now to the drawing, the electromagnetic valve unit comprises an electromagnetic motor assembly 1 and a flow control valve assembly 2 arranged to be actuated in response to operation of the motor assembly 1. The electromagnetic motor assembly 1 includes a cylindrical motor housing 3 of magnetic material, an annular-shaped solenoid coil 4 concentrically assembled within the motor housing 3, a stationary core 5 of magnetic material surrounded by the solenoid coil 4, a yoke member 6 of magnetic material fitted at its outer periphery to a fitting face of motor housing 3 at the left end of solenoid coil 4, a shaft 7 of non-magnetic material supported for axial movement in the stationary core 5 and yoke member 6, and a movable core 12 of magnetic material fixed to an intermediate portion of shaft 7.

The stationary core 5 is integrally formed at its right end with a tubular extension 5a which is supported in an end plate 9 of magnetic material and extends outwardly through the motor housing 3. The stationary core 5 is also formed therein with a stepped axial bore in which a bearing piece 11 of non-magnetic material is fixedly assembled to support the shaft 7 slidably in both axial directions. The stationary core 5 is further formed at its left end face with an annular recess 13 of a trapezoidal cross-section confronting the movable core 12. The yoke member 6 is formed at its right end face with an annular stepped portion 6b to be arranged coaxial with the stationary core 5 and is formed at its left end face with an annular shoulder 6c coupled within the valve assembly housing 14 for alignment of shaft 7 in relation to a valve seat member 25. The yoke member 6 is also provided therein with a stepped axial bore in which a bearing piece 16 of non-magnetic material is fixedly assembled to support the shaft 7 slidably in both axial directions.

In such assembling procedure the solenoid coil 4 is wound around a bobbin 10 in surrounding relationship with the stationary core 5 and a sleeve member 8 of non-magnetic material. The sleeve member 8 is coupled over the stationary core 5 and the stepped portion of yoke member 6 for alignment of the bearing pieces 11 and 16 on a common axis. The yoke member 6 has an outer peripheral flange 6a interposed between the corresponding fitting faces of motor housing 3 and a valve housing 14 of the valve assembly 2 which are secured to each other in a fluid-tight manner by means of screws 15 threaded therein. The movable core 12 is formed at its right end face with an annular projection 12a of a trapezoidal cross-section which is arranged to be received within the annular recess 13 of stationary core 5 in axial movement of the shaft 7.

The shaft 7 is received by a retainer member 17 of non-magnetic material at its right end and is loaded toward the valve assembly 2 by a compression coil spring 18 which is interposed between the retainer member 17 and an adjusting screw 19 threaded into the tubular extension 5a of stationary core 5, the pre-loading of spring 18 being adjustable by screw 19. A cover member 20 of hard synthetic rubber is coupled over the right end of motor housing 3 and filled with a synthetic resin material 21. A lead wire 22 is connected at its one end to the solenoid coil 4 and extends externally through the cover member 20 to be connected to an electric control circuit (not shown).

The flow control valve assembly 2 includes the valve housing 14 coupled over the annular shoulder of yoke member 6 and fitted at its fitting face to the outer peripheral flange 6a of yoke member 6 through an annular seal member 23. Inlet and exhaust ports 24a and 24b are provided in parallel on the valve housing 14, and the valve seat member 25 is fixedly assembled within the valve housing 14 to subdivide the interior of housing 14 into first and second chambers $R_1$ and $R_2$, respectively, in open communication with the inlet and exhaust ports 24a and 24b. A valve element 26 in the form of a disc member is fixedly mounted on the left end of shaft 7 to cooperate with the valve seat member 25 so as to control the flow of fluid between chambers $R_1$ and $R_2$. A bellows 27 of synthetic rubber is secured at its one end to the shaft 7 through a retainer 32 and at its other end to the yoke member 6 to enclose an intermediate portion of shaft 7 therein.

The valve element 26 is covered by a synthetic rubber member 28 in such a manner that the valve element 26 abuts against the valve seat member 25 through the rubber member 28. The valve element 26 is provided with an axial groove 26a, and the rubber member 28 engages in a fluid-tight manner the one end face of bellows 27. The bellows 27 is integrally formed at the other end thereof with an annular flange 29 which is fixed in a fluid-tight manner to an end face of the yoke member 6 through an annular seal member 30 of elastic material. The retainer 32 is provided with an axial groove 32a which communicates the interior of bellows 27 into the second chamber $R_2$ through the axial groove 26a of valve element 26. The seal member 30 engages at its one end face a ring member 31 fixed to an inner stepped shoulder 14a of valve housing 14 and at its other end face the yoke member 6.

In operation, the valve element 26 is in engagement with the valve seat member 25 under the pre-loading of spring 18 during deenergization of the solenoid coil 4. When the solenoid coil 4 is energized, an electric current applied to solenoid coil 4 from the electric control circuit generates a linear attraction force between the inner periphery of yoke member 6 and the outer periphery of movable core 12 and also between the annular recess 13 of stationary core 5 and the annular projection 12a of movable core 12. The linear attraction force acts to move the movable core 12 rightwardly against the pre-loading of spring 18 so as to disengage the valve element 26 from the valve seat member 25. In such operation, the bellows 27 is deflated or contracted during the rightward movement of shaft 7 and is inflated or expanded by the leftward movement of shaft 7 under the pre-loading of spring 18 upon deenergization of the solenoid coil 4. The annular flange 29 of bellows 27 does not receive any stress at a point thereof due to resilient engagement with the seal member 30. This serves to prevent damage of the bellows 27 caused by its repetitive deflation and inflation. In addition, the pressure in bellows 27 becomes equal to the pressure in the first chamber $R_1$ due to the fluid communication across the axial grooves 26a and 32a. This serves to ensure smooth axial movement of the shaft 7 without any influence by provision of the bellows 27.

Having now fully set forth both structure and operation of the preferred embodiment of the present invention, various other embodiments as well as certain various modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What is claimed is:

1. An electromagnetic valve unit including a flow control valve assembly for controlling the flow of fluid passing therethrough and operatively associated with an electromagnetic motor assembly for actuating said valve assembly in response to an electric current applied thereto from an electric control circuit, said motor assembly comprising:

a motor housing of magnetic material providing at one end thereof with a fitting face;

a solenoid coil concentrically assembled within said motor housing and connected to said electric control circuit;

a stationary core of magnetic material surrounded by said solenoid coil;

a yoke member of magnetic material fitted at its outer periphery to the fitting face of said motor housing and having a stepped portion arranged to be coaxial with said stationary core;

a shaft of non-magnetic material extending through the axes of said stationary core and said yoke member into said valve assembly;

first and second bearing means for axially slidably supporting said shaft, respectively, from said stationary core and said yoke member;

a movable core of magnetic material fixed to said shaft to be axially moved between said stationary core and said yoke member, said stationary core and said movable core having first and second confronting end faces;

a sleeve member of non-magnetic material surrounded by said solenoid coil and having positioned therewithin said stationary core and the stepped portion of said yoke member for alignment of said first and second bearing means;

resilient means for loading said shaft toward said valve assembly;

said valve assembly comprising:

a valve housing secured to said motor housing through the outer periphery of said yoke member and being provided with first and second ports;

a valve seat member assembled within said valve housing to subdivide the interior of said valve housing into first and second chambers, respectively, in open communication with said first and second ports, said valve seat member being in surrounding relationship with said shaft; and a valve element fixed to said shaft to cooperate with said valve seat member to control the flow of fluid between said first and second chambers in response to axial movement of said shaft wherein said valve assembly further comprises bellows means interposed in a fluid-tight manner between said yoke member and said shaft for preventing the flow of fluid from the interior of said valve housing into said motor assembly.

2. An electromagnetic valve unit as set forth in claim 1, further comprising an annular seal member of elastic material wherein said bellows means further comprises an annular flange which is fixed in a fluid-tight manner to said yoke member through said annular seal member.

3. An electronmagnetic valve unit as set forth in claim 1 or 2, further comprising an axial passage means formed along said shaft wherein the interior of said bellows means is in open communication with the interior of said valve housing through said axial passage means formed along said shaft.

4. An electromagnetic valve unit as set forth in claim 1, wherein said yoke assembly further comprises an annular shoulder coupled within said valve housing for alignment of said shaft in relation to said valve seat member.

5. An electromagnetic valve unit as set forth in claim 1, wherein said stationary core further comprises an integrally formed tubular extension extending outwardly therefrom through said motor housing, and further comprising an adjusting screw threaded into the tubular extension of said stationary core for adjusting pre-loading of said resilient means.

6. An electromagnetic valve unit as set forth in claim 1, wherein said first confronting end face further comprises an annular recess of a trapezoidal cross-section, and the second end face further comprises an annular projection of a trapezoidal cross-section for being received within said annular recess.

7. An electromagnetic valve unit including a flow control valve assembly for controlling the flow of fluid passing therethrough and operatively associated with an electromagnetic motor assembly for actuating said valve assembly in response to an electric current applied thereto from an electric control circuit, said motor assembly comprising:

a motor housing of magnetic material provided at one end thereof with a fitting face;

a solenoid coil assembled within said motor housing and connected to said electric control circuit;

a stationary core of magnetic material surrounded by said solenoid coil;

a yoke member of magnetic material fitted at its outer periphery to the fitting face of said motor housing and having a stepped portion arranged to be coaxial with said stationary core;

a shaft of non-magnetic material extending through the axes of said stationary core and said yoke member into said valve assembly;

first and second bearing means for axially slidably supPorting said shaft respectively from said stationary core and said yoke member;

a movable core of magnetic material fixed to said shaft to be axially moved between said stationary core and said yoke member, said stationary core and said movable core having confronting end faces;

a sleeve member of non-magnetic material surrounded by said solenoid coil and coupled over said stationary core and the stepped portion of said yoke member for alignment of said first and second bearing means; and resilient means for leading said shaft toward said valve assembly;

said valve assembly comprising:

a valve housing secured to said motor housing through the outer periphery of said yoke member and being provided with first and second ports;

a valve seat member assembled within said valve housing to subdivide the interior of said valve housing into first and second chambers, respectively, in open communication with said first and second ports, said valve seat member being in surrounding relationship with said shaft;

a valve element fixed to said shaft to cooperate with said valve seat member to control the flow of fluid between said first and second chambers in response to axial movement of said shaft; and bellows means interposed in a fluid-tight manner between said yoke member and said shaft for preventing the flow of fluid from the interior of said valve housing into said motor assembly, wherein said bellows means further comprises an annular flange which is disposed in an annular space formed between an end face of said yoke member and an inner stepped shoulder of said valve housing, said annular flange contacting fixed in a fluid-tight manner said end face of said yoke member.

8. An electromagnetic valve unit as set forth in claim 7, further comprising in annular seal member of elastic material disposed in said annular space for holding in place the annular flange of said bellows means.

9. An electromagnetic valve unit as set forth in claim 7, further comprising an axial passage means formed along said shaft and across said valve member for communicating the interior of said bellows means with the interior of said valve housing.

* * * * *